United States Patent [19]

Yamaguchi et al.

[11] Patent Number: 5,014,072

[45] Date of Patent: May 7, 1991

[54] THERMAL PRINTING APPARATUS

[75] Inventors: Koshiro Yamaguchi, Inuyama; Hiroshi Hattori, Nagoya, both of Japan

[73] Assignee: Brother Kogyo Kabushiki Kaisha, Aichi, Japan

[21] Appl. No.: 413,220

[22] Filed: Sep. 27, 1989

[30] Foreign Application Priority Data

Oct. 5, 1988 [JP] Japan ................................ 63-251390

[51] Int. Cl.[5] .......................... G01D 15/10; B41J 2/00

[52] U.S. Cl. ................................ 346/76 PH; 400/120; 400/240.3; 400/240.4

[58] Field of Search .................... 346/76 PH; 400/120, 400/240, 240.3, 240.4

[56] References Cited

U.S. PATENT DOCUMENTS

| | | | |
|---|---|---|---|
| 4,378,566 | 3/1983 | Tsukamura | 346/76 PH X |
| 4,496,955 | 1/1985 | Maeyama et al. | 346/76 PH |
| 4,620,199 | 10/1986 | Tatsumi et al. | 346/76 PH |
| 4,667,208 | 5/1987 | Shiraki et al. | 346/76 PH |
| 4,704,615 | 11/1987 | Tanaka | 346/76 PH |
| 4,769,258 | 9/1988 | Kobayashi et al. | 427/146 |

*Primary Examiner*—Benjamin R. Fuller
*Assistant Examiner*—Gerald E. Preston
*Attorney, Agent, or Firm*—Oliff & Berridge

[57] ABSTRACT

A thermal printing apparatus is disclosed wherein a first printing operation is performed by transferring a thermo-melting ink of one primary color to a print medium and at least one subsequent printing operation may be performed by transferring a thermo-melting ink of another primary color to the previously transferred ink on the print medium in a superposed fashion, thereby printing of multiple colors is accomplished. The thermal printing apparatus includes a controlling system which determines whether a printing operation to be performed is the first printing operation or a subsequent printing operation and controls a printing speed of a carriage supporting a thermal head according to the determination. For instance, in the case where the thermo-melting ink contains a coloring agent and a binder of waxy substance, the printing speed of the carriage during subsequent printing operations is controlled to be slower than that during the first printing operation.

15 Claims, 3 Drawing Sheets

THERMAL PRINTING APPARATUS

FIELD OF THE INVENTION

The present invention relates to a thermal printing apparatus wherein a thermal head heats a thermo-transfer ribbon and transfers a melted ink from the ribbon to a print medium and, in particular, to a thermal printing apparatus capable of performing a printing operation by transferring a melted ink to a print medium upon which ink has previously been transferred, in a superposed fashion.

BACKGROUND OF THE INVENTION

In a conventional thermal printing apparatus, a thermal head presses a surface of a thermo-transfer ribbon coated with an ink to a print paper and heats the ink until it is melted. The melted ink is torn from the ribbon and is transferred to the print paper, so that a desired character is printed on the paper.

As such conventional thermal printing apparatus, a color printing apparatus is known, wherein the ink of each color among three primary colors, namely yellow, magenta and cyan, is sequentially transferred to the print paper in a superposed fashion, and thereby a multi-color printing operation is performed. The operation for multiple-color printing includes a first process of transferring the ink of one primary color to the print paper and a second process of transferring the ink of another primary color to the paper having previously had ink transferred thereto, in a superposed fashion. A printing speed at which the thermal head is moved relative to the print paper, is set to be equal in both processes.

Upon transferring the ink, however, adhesive force between the print paper and the ink is different from adhesive force between the ink transferred to the paper and the ink to be superposed. For instance, in the case where an ink of the thermo-transfer ribbon is constituted with a coloring agent and a binder of waxy substance such as paraffin wax, carnauba wax and castor wax, the ink melted by the thermal head has relatively strong adhesive force to the print paper, because the melted ink partly soaks into the paper. But, the adhesive force of the melted ink to the transferred ink is not strong, because the agglomerating force of the melted ink with the transferred ink is weak owing to low viscosity of the melted ink. On the other hand, in the case where an ink of the thermo-transfer ribbon is constituted with a coloring agent and a binder of resinous substance such as rosin and ethylene-vinyl acetate copolymer resin, the adhesive force of the melted ink to the transferred ink is strong, because the agglomerating force of the melted ink with the transferred ink is strong owing to high viscosity of the melted ink. But, the adhesive force of the ink to the print paper is not strong, because little melted ink soaks into the paper.

Thus, the adhesive force of the ink is different depending on a material of the print medium and a property of the ink. If the ink having the weak adhesive force to the print medium is used and the printing operation is performed at a normal speed, insufficient ink is transferred to the print medium, so that the required printing cannot be performed. Namely, if the first process and second process are performed at the same printing speed and the ink constituted with waxy substance is used, the agglomerating force of the ink melted in the second process is weak when the ink is not chilled sufficiently, so that insufficient ink is torn from the thermo-transfer ribbon. Consequently, there occurs defective transference such as printing with dimmed characters.

SUMMARY OF THE INVENTION

Accordingly, it is an object of the present invention to provide a thermal printing apparatus capable of reducing a defective transference when ink is transferred to a print medium having thereon ink which was previously transferred, in a superposed fashion.

In order to accomplish the above-mentioned object, there is provided a thermal printing apparatus having driving means for moving a carriage along a platen at a printing speed, thermo-transfer ribbon means coated with a thermo-melting ink, and a thermal head supported on the carriage and operative to heat the thermo-transfer ribbon means to print a desired character on a print medium, wherein a first printing operation is performed by transferring a thermo-melting ink to the print medium and at least one subsequent printing operation is performed by transferring thermo-melting ink onto the first transferred ink on the print medium in a superposed manner. This printing apparatus comprises determining means for determining whether a printing operation to be performed is the first printing operation or the subsequent printing operation; and controlling means responsive to the determining means for controlling the driving means so that a printing speed of the carriage during the subsequent printing operation is different from a printing speed of the carriage during the first printing operation.

In the thermal printing apparatus having the foregoing construction, the controlling means controls so that a printing speed of the carriage is different in the first printing operation and in the subsequent printing operation, thereby the thermo-transfer ribbon means is torn from the print medium at proper time. Consequently, the thermal printing apparatus according to the present invention can obtain good quality on printing by transferring ink to the first transferred ink in a superposed fashion, so that color reproduction and expression with color gradation are rendered accurate.

BRIEF DESCRIPTION OF THE DRAWINGS

The above and other objects, features and advantages of the present invention will become more apparent from reading the following description of the preferred embodiment taken in connection with the accompanying drawings in which.

DETAILED DESCRIPTION OF THE PREFERRED EMBODIMENTS

Referring to the accompanying drawings, an embodiment of the thermal printing apparatus according to the present invention will now be explained.

Figure 1:
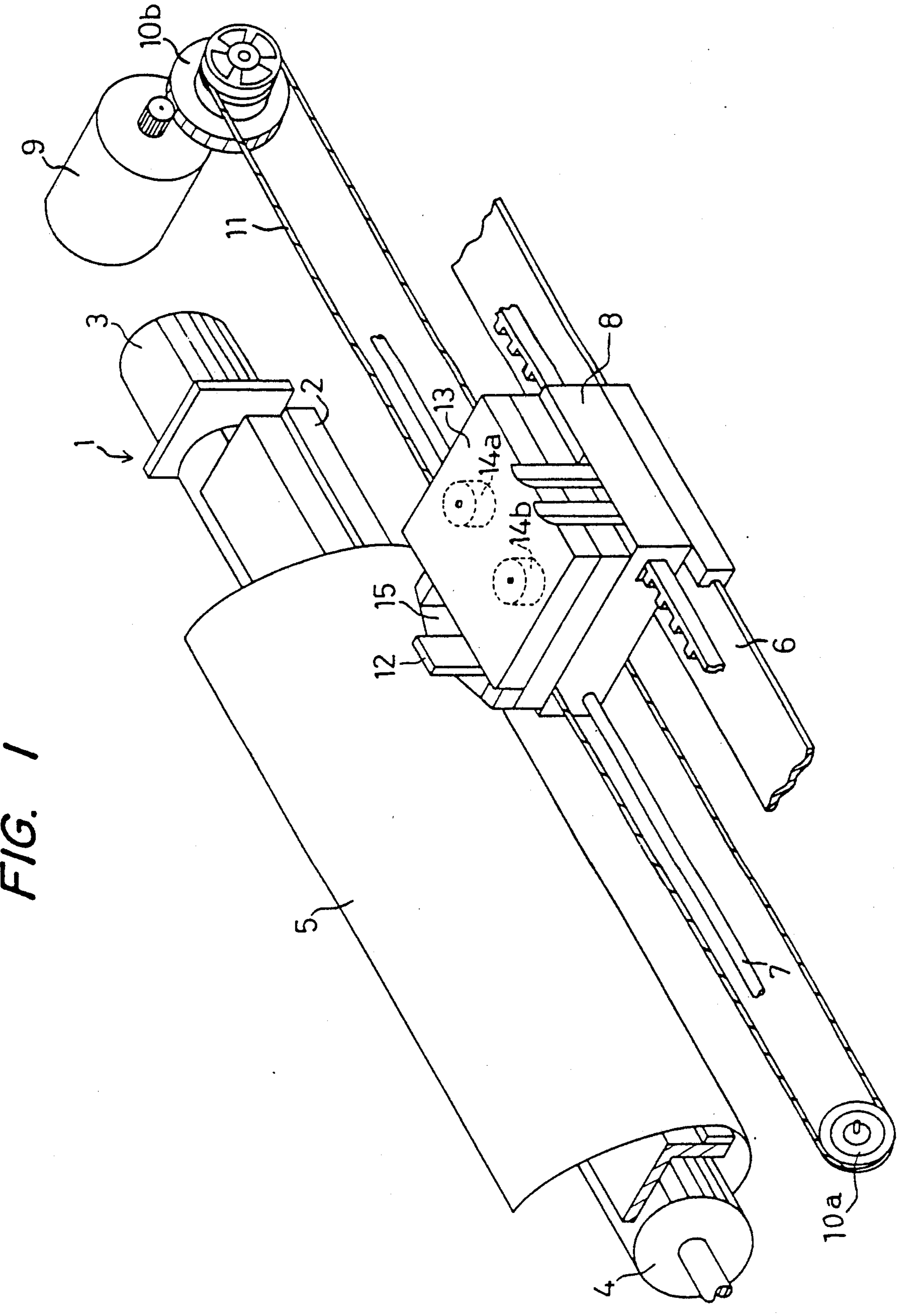
FIG. 1 is a perspective view showing an internal mechanism of an embodiment of a thermal printing apparatus according to the present invention.

As shown in FIG. 1, a main body 1 of the thermal printing apparatus is provided with a pair of frames (not shown) on both sides. A plate-like platen 2 is secured between the frames and supports a print paper 5 supplied through rotation of a paper feed roller 4, which is operatively connected with a paper feed motor 3. A carriage guide plate 6 and a carriage guide rod 7 are secured to the above-mentioned frames so as to be parallel to the platen 2. A carriage 8 is supported by the guide plate 6 and the guide rod 7 so as to be moved in a longitudinal direction of the platen 2. A driving wire 11 is extended between a driven pulley 10*a* and a driving pulley 10*b* connected with a carriage driving motor 9 and is connected with the carriage 8. Accordingly, the carriage 8 is driven in the longitudinal direction of the platen 2 by means of rotation of the driving motor 9. A thermal head 12 is mounted on the carriage 8 for printing on the print paper 5, and a ribbon cassette 13 is detachably mounted on the carriage 8. In this ribbon cassette 13, a feed spool 14*a* and a take-up spool 14*b* are rotatably supported. The take-up spool 14*b* is adapted to be driven by a ribbon take-up motor 26 depicted diagrammatically in FIG. 2. A thermo-transfer ribbon 15 is wound around both spools 14*a*, 14*b*.

In addition, the ribbon 15 is taken up by the take-up spool 14*b* when the carriage 8 is moved by the rotation of the driving motor 9. The take-up speed of the ribbon 15 is substantially equal to the moving speed (the printing speed) of the carriage 8. The thermo-transfer ribbon 15 is repeatedly coated with thermo-melting inks of three different primary colors of yellow, magenta and cyan along its length in such a manner that the ribbon portion coated with the ink of each primary color is as long as one line to be printed. Accordingly, the ink color of the ribbon 15 is changed every time the ribbon 15 is taken up around the take-up spool 14*b* by means of one line movement of the carriage 8. A bar code corresponding to each primary color is provided on the thermo-transfer ribbon 15 and is adapted to be detected by a sensor disposed closely to the thermal head 12. When the bar code is detected by the sensor, a starting point of each primary color is positioned. In order to superpose two different primary colors, the same line of the print paper 5 is printed with the inks of different colors.

Figure 2:
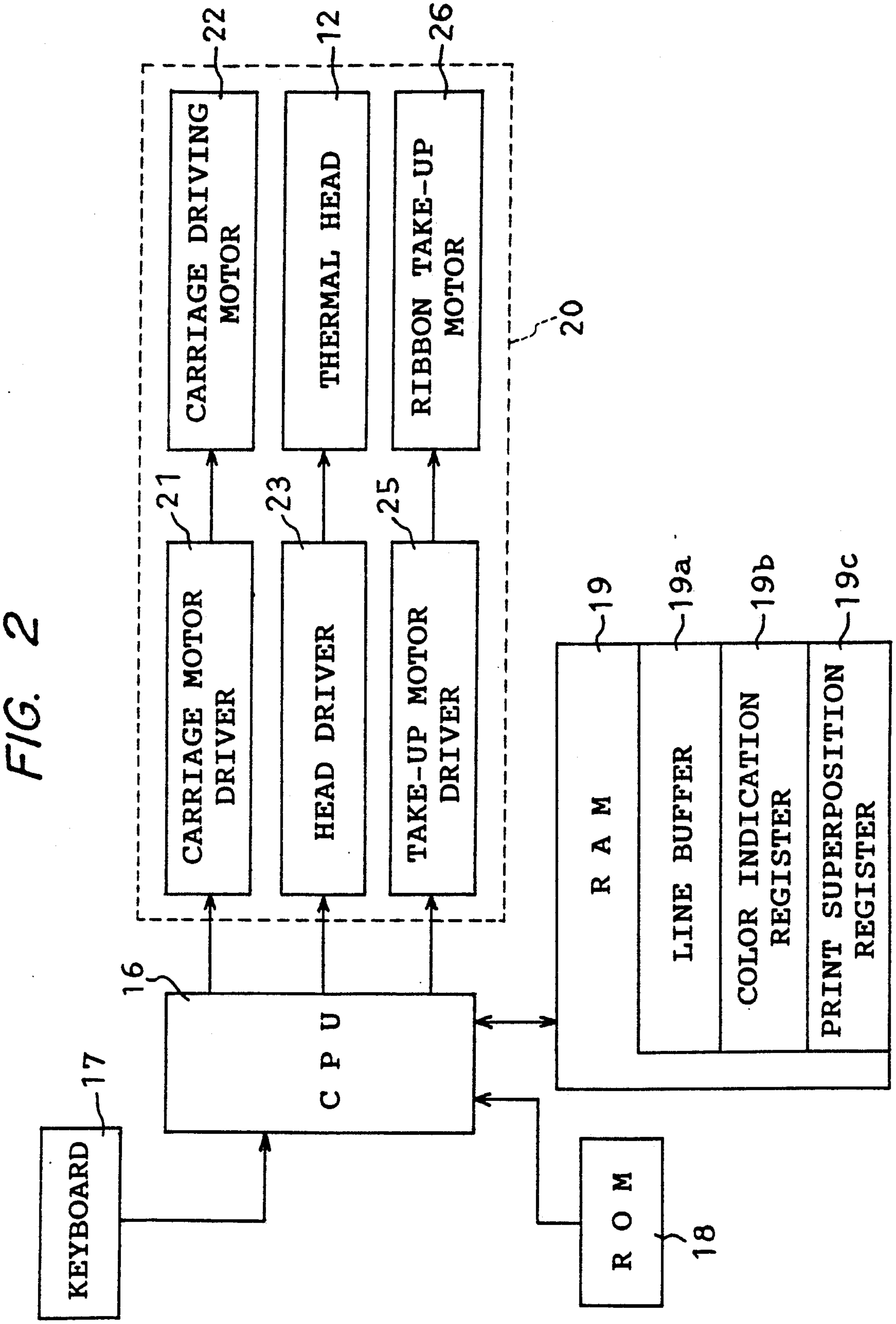
FIG. 2 is a block diagram showing a controlling system of the thermal printing apparatus.

Next, a controlling system of the embodiment will be explained in reference to FIG. 2.

Connected to a CPU (central processing unit) 16 are a keyboard 17 having multiple input keys, a ROM (read only memory) 18 and a RAM (random access memory) 19, respectively. The ROM 18 stores pattern data for printing patterns such as characters and symbols in a dot-matrix form as well as a program for controlling a printing operation. The thermal printing apparatus of this embodiment is capable of selectively printing characters or symbols with seven different colors determined by the combination of the three primary colors, so the keyboard 17 is provided with seven color indicating keys, each of which is operated to indicate a desired color before characters or symbols to be printed with the desired color are inputted through the keyboard 17. The RAM 19 is provided with a line buffer 19*a*, a color indication register 19*b* and a print superposition register 19*c*. The line buffer 19*a* comprises a plurality of memory units which each correspond to a print position of a character or a symbol inputted through the keyboard 17 and are capable of storing pattern data of one line to be printed. Each of the memory units stores pattern data of one byte indicative of one character or one symbol. The color indication register 19*b* comprises memory areas individually corresponding to the memory units of the line buffer 19*a*. Each of the memory areas is capable of storing three color indication flags individually corresponding to three primary colors The states of three color indication flags in each of the memory areas are determined by the operation of the foregoing seven color indicating keys. In this embodiment, one bit is allotted to each of the color indication flags. Thus, a color of one character or one symbol stored in each memory unit is determined by a combination of the set states of three color indication flags stored in each memory area. The color indication register 19*b* further comprises three additional memory areas for storing three color print flags individually corresponding to three primary colors. Each of three color print flags is set to "ON" when at least one color indication flag of the corresponding primary color in one line to be printed has been set to "ON" In this embodiment, one bit is allotted to each of the color print flags. The print superposition register 19*c* is capable of storing a superposition flag for determining whether a printing operation is performed in a superposed fashion or not, namely whether one or more color print flags have been set to "ON" after printing one line with one primary color. When at least one color print flag has been set to "ON" after printing of one line, the superposition flag is set to "ON". In this embodiment, one bit is allotted to the superposition flag for pattern data of one line.

Furthermore, a driving system 20 is connected to the CPU 16. The driving system 20 includes a carriage driving motor 22 and a carriage motor driver 21 for moving the carriage 8 in a longitudinal direction of the platen 2 at a desired printing speed; the thermal head 12 and a head driver 23 for driving the thermal head 12 to heat the thermo-transfer ribbon 15; and the ribbon take-up motor 26 and a take-up motor driver 25 for winding the ribbon 15 around the take-up spool 14*b*.

Figure 3:
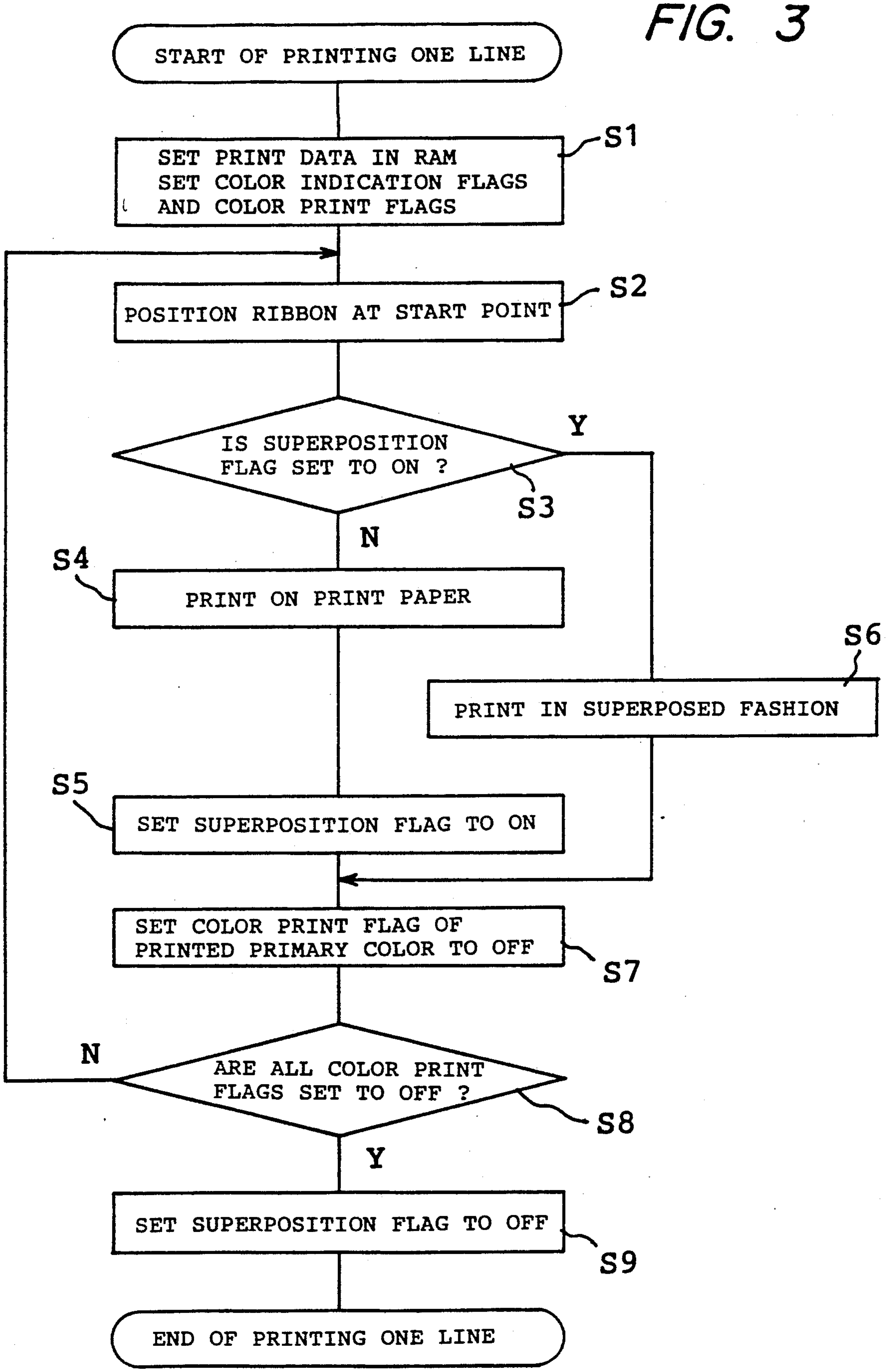
FIG. 3 is a flow chart showing an operation of the controlling system.

Operation of the embodiment will be explained with reference to the flow chart shown in FIG. 3. The flow chart shows an operation for printing one line in the case where the ink constituted with a coloring agent and a binder of waxy substance such as paraffin wax and carnauba wax is used as the color ink of the ribbon 15.

First, in step Sl, data inputted through the keyboard 17 is stored as print data in the line buffer 19*a* of the RAM 19, and then the color indication flags in the color indication register 19*b* of the RAM 19 are set to "ON" so as to indicate a color of each character or each symbol to be printed. For instance, if an operator selects green as a color of a character or a symbol through the keyboard 17, two color indication flags corresponding to yellow and cyan are set to "ON" and the color indication flag corresponding to magenta is set to "OFF". After inputting the data of the characters or symbols and their colors for one line, the color print flags, which correspond to the primary colors indicated by the "ON" states of the color indication flags, are set to "ON" and the other color print flag is set to "OFF". For instance, in the case where only green is selected as a color of one line, like the color indication flags, the color print flags corresponding to yellow and cyan are set to "ON" and the other color print flag corresponding to magenta is set to "OFF". In the case where green and red are selected as colors of one line, all of the color print flags are set to "ON", because two color indication flags of yellow and cyan representing green for some characters in one line are set to "ON" and also two color indication flags of yellow and magenta representing red for the rest in one line are set to "ON". In step S2, the ribbon 14 is wound around the take-up spool 14*b* by the ribbon take-up motor 26 based on the color print flags set to "ON" in the color indication register 19*b*, and a start point of a primary color to be first printed is detected by the foregoing sensor and is positioned relative to the print paper 5. In step S3, it is determined whether the superposition flag in the print superposition register 19*c* has been set to "ON" or not.

If it is determined that the superposition flag has not been set to "ON", namely that a printing operation is performed with the ink transferred to the print paper 5 not having ink previously transferred, one line is printed at a first printing speed (a high moving speed of the carriage 8), e.g., 60 cps, in step S4. In step S5, the superposition flag of the print superposition register 19*c* is set to "ON", and processing shifts to step S7. If it is determined in step S3 that the superposition flag has been set to "ON" in the print superposition register 19*c*, the line is printed at a second slower speed (a slow moving speed of the carriage 8), e.g., 30 cps, in step S6, since the ink is transferred to the previously transferred ink on the print paper 5 in a superposed fashion.

In step S7, the color print flag corresponding to the primary color, with which one line has now been printed, is set to "OFF", and processing shifts to step S8. In step S8, it is determined whether all of three color print flags have been set to "OFF" in the color indication register 19*b*. If it is determined here that at least one color print flag remains "ON", processing returns to step S2 and steps S2 through S8 are repeated until it is determined in step S8 that all color print flags have been set to "OFF". Since the superposition flag will have been switched to "ON" in the initial printing of a line, in subsequent superposed printing of the line, a slow printing speed, e.g., 30 cps is used in step S6. If all color print flags are determined to be set to "OFF" in step S8, the superposition flag is set to "OFF" in step S9, and thereby printing of one line with the desired colors is completed.

In the embodiment described above, an ink comprising a binder of waxy substance is used as a color ink. Alternatively, an ink comprising a binder of resinous substance such as rosin and ethylene-vinyl acetate copolymer resin may be used. In this case, a slow printing speed is required when the ink is first transferred to a print paper, since it is necessary to tear off a thermo-transfer ribbon from the print paper after the ink has agglomerated, owing to the weak adhesive force between the melted ink and the print paper. On the other hand, when the ink is transferred to the already transferred ink on the print paper in a superposed fashion, a relatively fast printing speed is provided because of the strong agglomerating force of the melted ink.

In this embodiment, three thermo-melting inks of three primary colors are coated on one thermo-transfer ribbon 15 together, alternatively three thermo-melting inks may be coated on three different thermo-transfer ribbons, respectively.

Three color indication flags of this embodiment are stored in the color indication register 19*b* separately from pattern data in the line buffer 19*a*, but three color indication flags and pattern data may be stored in each of plural memory units of one line buffer. For instance, two bytes may be allotted to each memory unit in such a manner that the first byte is provided for pattern data of one character or one symbol and the second byte is provided for three color indication flags, pitch data and underline data.

In addition, a print medium is not limited to a print paper, but the paper may be replaced with other kinds of materials.

It should be understood that the present invention is not limited to the above description, but is subject to modifications, alterations and equivalent arrangements within the scope of the appended claims. Thus, while only certain embodiments of the invention have been specifically described herein, it will be apparent from the above teachings that numerous modifications may be made thereto without departing from the spirit and scope of the invention.

What is claimed is:

1. A thermal printing apparatus having driving means for moving a carriage along a platen at a printing speed, thermotransfer ribbon means coated with a thermo-melting ink, and a thermal head supported on the carriage and operative to heat the thermo-transfer ribbon means to print a desired character on a print medium, wherein a first printing operation is performed by transferring a thermo-melting ink to the print medium and at least one subsequent printing operation may be performed by transferring a thermo-melting ink to the previously transferred ink on the print medium in a superposed fashion, said thermal printing apparatus comprising:

determining means for determining whether a printing operation to be performed is said first printing operation or said at least one subsequent printing operation; and controlling means responsive to said determining means for controlling said driving means so that a printing speed of said carriage during said at least one subsequent printing operation is different from a printing speed of said carriage during said first printing operation.

2. A thermal printing apparatus according to claim 1, wherein said thermo-transfer ribbon means is coated with three thermo-melting inks of three different primary colors in such a manner that portions along the length of said ribbon means are coated with the ink of each primary color, respectively, each of said portions having a length corresponding to a line of print, and said ribbon means is taken up by a ribbon take-up motor for printing a required color among said three primary colors.

3. A thermal printing apparatus according to claim 1, wherein said thermo-melting ink of said thermo-transfer ribbon means contains a coloring agent and a binder of waxy substance, and said controlling means controls said driving means so that a printing speed of said carriage during said at least one subsequent printing operation is slower than a printing speed of said carriage during said first printing operation.

4. A thermal printing apparatus according to claim 1, wherein said thermo-melting ink of said thermo-transfer ribbon means contains a coloring agent and a binder of resinous substance, and said controlling means controls said driving means so that a printing speed of said carriage during said at least one subsequent printing operation is faster than a printing speed of said carriage during said first printing operation.

5. A thermal printing apparatus according to claim 1, wherein said controlling means selects one of two different printing speeds of said carriage, which are predetermined correspondingly to said first and at least one subsequent printing operations, respectively, in response to the determination of said determining means.

6. A thermal printing apparatus according to claim 1, wherein said thermo-transfer ribbon means has three thermomelting inks of three different primary colors, said determining means includes memory means having plural memory areas each of which corresponds to one character or one symbol to be printed and stores three flags corresponding to said three primary colors, each of said three flags is set to one of two states according to a color of one character or one symbol to be printed, and said determining means determines based on the set states of said three flags whether a printing operation to be performed is said first printing operation or said at least one subsequent printing operation.

7. A thermal printing apparatus having driving means for moving a carriage along a platen at a printing speed, a thermo-transfer ribbon means coated with three thermo-melting inks of three different primary colors, and a thermal head supported on the carriage and operative to heat the thermotransfer ribbon means to print a desired character on a print medium, wherein a first printing operation is performed by transferring a thermo-melting ink of one primary color to the print medium and at least one subsequent printing operation may be performed by transferring a thermo-melting ink of another primary color to the previously transferred ink on the print medium in a superposed fashion, said thermal printing apparatus comprising:

means for storing plural color indication signals each of which is indicative of said primary colors used to print each character or each symbol in one line;

means for storing a color print signal indicative of said primary colors required to print one line, an initial content of said color print signal being determined based on said plural color indication signals;

means for changing the content of said color print signal every time one line is printed with each of said required primary colors indicated by said color print signal, the content of said color print signal being changed into a content indicative of a remaining primary color of said required primary colors other than said primary color with which one line has been printed;

determining means for determining based on the content of said color print signal whether all of said required primary colors have been printed;

means for storing a superposition signal having a first state and a second state, said superposition signal being set to said first state before said first printing operation is performed and when said determining means determines that all of said required primary colors have been printed after said first printing operation, and being set to said second state when said determining means determines that all of said required primary colors have not been printed after said first printing operation; and controlling means responsive to the state of said superposition signal for selecting one of two different printing speeds of said carriage predetermined correspondingly to said first and at least one subsequent printing operations.

8. A thermal printing apparatus according to claim 7, wherein said thermo-melting ink of said thermo-transfer ribbon means contains a coloring agent and a binder of waxy substance, and said controlling means controls said driving means so that a printing speed of said carriage during said at least one subsequent printing operation is slower than a printing speed of said carriage during said first printing operation.

9. A thermal printing apparatus according to claim 7, wherein said thermo-melting ink of said thermo-transfer ribbon means contains a coloring agent and a binder of resinous substance, and said controlling means controls said driving means so that a printing speed of said carriage during said at least one subsequent printing operation is faster than a printing speed of said carriage during said first printing operation.

10. A thermal printing apparatus having driving means for moving a carriage along a platen at a printing speed, thermotransfer ribbon means coated with three thermo-melting inks of three different primary colors, and a thermal head supported on the carriage and operative to heat the thermo-transfer ribbon means to print a desired character on a print medium, wherein a first printing operation is performed by transferring a thermomelting ink of one primary color to the print medium and at least one subsequent printing operation may be performed by transferring a thermo-melting ink of another primary color to the previously transferred ink on the print medium in a superposed fashion, said thermal printing apparatus comprising:

storing means for storing a color indication signal indicative of said primary colors required for colors of characters or symbols in a predetermined printing area on said print medium;

determining means for determining based on said color indication signal whether said at least one subsequent printing operation is required within said predetermined printing area; and controlling means responsive to said determining means determining that said at least one subsequent printing operation is required, for controlling said driving means so that a printing speed of said carriage during said at least one subsequent printing operation is different from a printing speed of said carriage during said first printing operation.

11. A thermal printing apparatus according to claim 10, wherein said thermo-melting ink of said thermotransfer ribbon means contains a coloring agent and a binder of waxy substance, and said controlling means controls said driving means so that a printing speed of said carriage during said at least one subsequent printing operation is slower than a printing speed of said carriage during said first printing operation.

12. A thermal printing apparatus according to claim 10, wherein said thermo-melting ink of said thermotransfer ribbon means contains a coloring agent and a binder of resinous substance, and said controlling means controls said driving means so that a printing speed of said carriage during said at least one subsequent printing operation is faster than a printing speed of said carriage during said first printing operation.

13. A thermal printing apparatus according to claim 10, wherein said determining means further determines whether a printing operation to be performed is said first printing operation or said at least one subsequent printing operation, and said controlling means selects one of two different printing speeds of said carriage, which are predetermined correspondingly to said first and at least one subsequent printing operations, respectively, in response to the determination of said determining means.

14. A thermal printing apparatus according to claim 10, wherein said storing means stores said color indication signal, said color indication signal comprising plural sets of three color indication flags corresponding to said three primary colors, each set of said three color indication flags indicating a color of each character or each symbol in said predetermined printing area to be printed.

15. A thermal printing apparatus according to claim 14, wherein said predetermined printing area is one line on said print medium.

* * * * *